350-373 SR CROSS REFERENCE SEARCH ROOM
XR 3,234,381

INVENTORS
PHILIP M. De GROAT
GARY O. JAMESON
BY
Bernard N. Wiener
ATTORNEY

3234381
OR IN 250/317

United States Patent Office 3,234,381

Patented Feb. 8, 1966

3,234,381

METHOD FOR INFORMATION HANDLING BY THE EXPOSURE OF STRETCHED RUBBER TO A THERMAL PATTERN

Philip M. De Groat, Newark Valley, and Gary O. Jameson, Candor, N.Y., assignors to International Business Machines Corporation, New York, N.Y., a corporation of New York Filed Jan. 2, 1962, Ser. No. 163,427
11 Claims. (Cl. 250—65)

This invention relates generally to information handling and it relates more particularly to apparatus and method for storage and display of information by energy pattern conversion in a medium which is sensitized therefor by selectively treating it.

Information handling by energy pattern conversion includes the storage and display of data information or pictorial information with a sensitized medium by conversion of a representative energy pattern therein to a display of the information. An energy pattern representative of the data information or pictorial information is stored in the sensitized medium as local and differential changes in a physical property thereof in accordance with the pattern. A characteristic of the physical property is utilized to display the information pattern.

Information handling dynamically by a medium connotes that its display continues for a relatively short time interval after its storage, whereas information handling statically by a medium connotes that its display continues for a relatively long time interval after its storage. It is desirable that an information pattern be displayed selectively either dynamically or statically by the same medium. Heretofore, the dynamic and static handling of energy pattern information have required different media therefor. One type of medium displays an energy pattern transiently, e.g., a projection screen technique for a thermal image. Another type of medium displays an energy pattern statically, e.g., a photographic emulsion technique for a thermal image. Prior art thermal image converters include types known as evaporgraphs, phosphor-tubes, liquid-film tubes and electronic scanning tubes.

A thermal image is a pattern of data information or pictorial information after it is represented by a thermal energy pattern. The thermal energy pattern may be either in the form of a pattern of infrared radiant energy or in the form of a temperature distribution map of an object. Thermal image conversion connotes that a medium sensitized therefor translates the thermal image to an optical image.

It is desirable that an information pattern which is being displayed dynamically by a medium be stored thereby statically. Heretofore, it has not been possible to store an information pattern statically in a medium which was displayed it dynamically.

It is desirable that an information pattern which is being displayed statically by a medium be made permanent therein. An information pattern is made permanent in a medium when energy comparable to the energy pattern which was stored in the medium does not expose the region adjacent the pattern. Heretofore, a complex fixing technique has been required to make an information pattern permanent in a medium which is displaying it statically.

It is desirable that a medium which is storing an information pattern permanently be re-sensitizable for further information handling. Heretofore, it has not been possible to re-sensitize a medium for information handling after an information pattern has been made permanent therein.

Certain characteristics of a medium for information handling measure its comparative ability to store and display an information pattern. The sensitivity of a medium connotes its ability to store a particular amount of information in a particular time interval. The resolving power of a medium connotes its ability to store accurately an information pattern. The resolution of the stored information connotes the accuracy with which it represents the imparted information pattern. The contrast of the stored information connotes the characteristic of its display which differentiates among information pattern shadings, i.e., it measures the ability of the medium to display the various colors present in the information pattern, e.g., black shadings and white shadings and the spectrum of grey shadings therebetween. It is desirable that a medium for information handling by energy pattern conversion store the information pattern with high sensitivity and high resolution and display the information with high contrast.

It is important for many commercial activities that information be readily stored and displayed both dynamically and statically. Illustratively, it is desirable that a copy of the information pattern on a document sheet be made easily and rapidly; it is desirable that digital information be stored rapidly in large quantity and be easily displayed. In the medical field it is desirable that a temperature distribution map of a selected epidermal surface be made easily and rapidly.

It is an object of this invention to provide a medium for energy pattern conversion which can be sensitized therefor by selectively treating it;

It is a second object of this invention to provide a medium for energy pattern conversion which can be sensitized therefor by selectively stressing it;

It is a third object of this invention to provide a medium for energy pattern conversion which can be sensitized therefor by selectively stressing it from a particular established physical condition at which it manifests elasticity to a strain state below its elastic limit;

It is a fourth object of this invention to provide a medium for energy pattern conversion which can be sensitized therefor by selectively stressing it from a particular established physical condition at which it manifests elasticity to a strain state below its elastic limit and which can be re-established in the particular physical condition after the energy pattern conversion;

It is a fifth object of this invention to provide a medium for thermal image conversion which can be sensitized therefor by selectively stressing it from a particular established condition at which it manifests rubber-like elasticity to a strain state below its elastic limit and which can be re-established in the particular physical condition after the thermal image conversion;

It is a sixth object of this invention to provide a medium for dynamic display of a thermal image which can be sensitized therefor by selectively stressing it sequentially from a particular established physical condition at which it manifests rubber-like elasticity to a strain state below its elastic limit;

It is a seventh object of this invention to provide a medium for static display of a thermal image which can be sensitized therefor by selectively stressing it sequentially from a particular established physical condition at which it manifests rubber-like elasticity to at least to a particular strain value below its elastic limit and relaxing it therefrom to an intermediate strain state;

It is an eighth object of this invention to provide a medium for energy pattern conversion which stores the pattern with high sensitivity and high resolution and displays it with high contrast;

It is a ninth object of this invention to provide a medium for storing an energy pattern as an embossed pattern thereon;

It is a tenth object of this invention to provide apparatus and method for storage and display of information by a medium which can be sensitized for energy pattern conversion by selectively treating it;

It is an eleventh object of this invention to provide apparatus and method for storage and display of information by a medium which can be sensitized for energy pattern conversion by selectively stressing it;

It is a twelfth object of this invention to provide apparatus and method for storage and display of information by a medium which can be sensitized for energy pattern conversion by selectively stressing it from a particular established physical condition at which it manifests elasticity to a strain state below its elastic limit;

It is a thirteenth object of this invention to provide apparatus and method for storage and display of information by a medium which can be sensitized for energy pattern conversion by selectively stressing it from a particular established physical condition at which it manifests elasticity to a strain state below its elastic limit and which can be reestablished in the particular physical condition after the energy pattern conversion;

It is a fourteenth object of this invention to provide apparatus and method for thermal image conversion by a medium which can be sensitized therefor by stressing it from a particular established physical condition at which it manifests rubber-like elasticity to a strain state below its elastic limit and which can be re-established in the particular physical condition after the thermal image conversion;

It is a fifteenth object of this invention to provide apparatus and method for selectively storing statically a thermal image in a medium which is displaying it dynamically;

It is a sixteenth object of this invention to provide apparatus and method for selectively displaying an energy pattern permanently in a selectively sensitized medium which has been displaying it statically;

It is a seventeenth object of this invention to provide apparatus and method for displaying by contrasting colors the shadings of an energy pattern with a medium selectively sensitized therefor;

It is an eighteenth object of this invention to provide apparatus and method for storing an information pattern as an engraved pattern in a medium selectively sensitized therefor;

It is a nineteenth object of this invention to provide apparatus and method for information pattern conversion with a medium sensitizable therefor which has low cost, ease of operation, immediate display of the converted pattern and availability of an extensive time interval for storing the pattern;

It is a twentieth object of this invention to provide apparatus and method for information pattern conversion with a medium sensitizable therefor which has the capability of displaying solely an information pattern which is representative of a moving object or whose energy content is changing; and It is a twenty-first object of this invention to provide apparatus and method for information pattern conversion with a medium sensitizable therefor which is adaptable to display an information pattern established with a wide range of electromagnetic frequencies.

The foregoing and other objects, features and advantages of the invention will be apparent from the following more particular description of preferred embodiments of the invention, as illustrated in the accompanying drawings.

Figure 14:
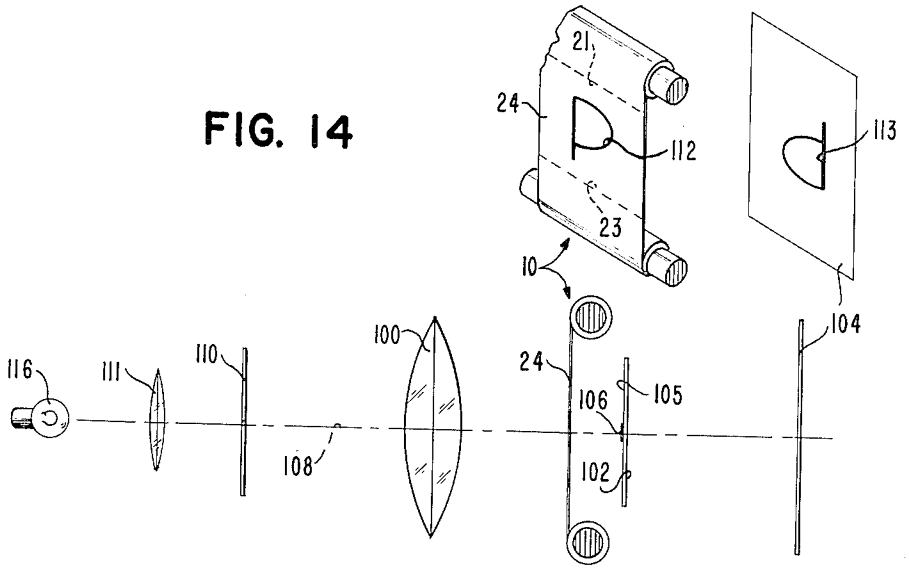
Figure 15:
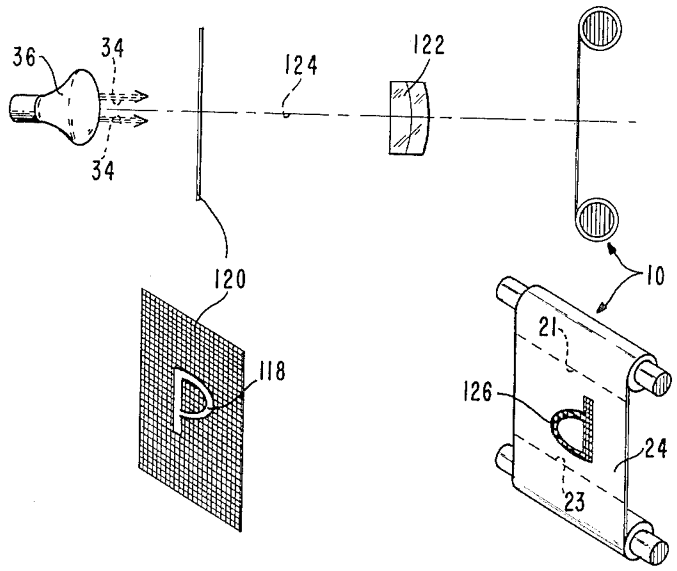

FIGURE 14 is a schematic view of a schlieren optical system with a sensitized medium disposed therewith, illustrating that an information pattern can be projected on a projection screen by a schlieren optical system; and FIGURE 15 is a schematic view of an infrared radiant energy projection system with an information pattern disposed therein, illustrating that the information pattern can be stored in a sensitized medium by projection of a representative infrared radiant energy pattern on the medium.

This invention provides apparatus and method for information handling reversibly and a medium therefor. The medium is sensitized for storage and display of the information by selectively stressing it from a particular established physical condition at which it manifests elasticity to a selected strain state below its elastic limit. An energy pattern representative of the information is imparted to the sensitized medium. A physical property related to the strain state is changed locally and differentially in accordance with the energy pattern. The information is displayed by the medium as characteristics of the physical property. The medium is re-established in the particular physical condition from the strain state by selectively relaxing the stress.

One feature of this invention is a medium which is sensitized for information handling by selectively stressing it from a particular established physical condition at which it manifests rubber-like elasticity to a selected strain state below its elastic limit.

A second feature of this invention is a medium which is sensitized for information handling dynamically by selectively stressing it sequentially from a particular established physical condition at which it manifests rubber-like elasticity to a selected strain state below its elastic limit.

A third feature of this invention is a medium which is sensitized for information handling statically by selectively stressing it sequentially from a particular established physical condition at which it manifests rubber-like elasticity to a particular strain state below its elastic limit and by selectively relaxing it therefrom to an intermediate strain state.

A fourth feature of this invention includes apparatus and method for information printing and a medium therefor. The medium is sensitized for storing a representative energy pattern as an embossed pattern thereon by selectively stressing it from a particular established physical condition at which it manifests rubber-like elasticity to a selected strain state below its elastic limit. The energy pattern is imparted to the sensitized medium and local and differential changes in a physical property thereof store it as an embossed pattern thereon. The embossed pattern is printed on an appropriate receptor material.

A fifth feature of this invention includes apparatus and method for engraving an information pattern in a medium. The medium is sensitized for storing a related energy pattern as an engraved pattern therein by selectively stressing it from a particular established physical condition at which is manifests rubber-like elasticity to a selected strain state below its elastic limit. The related energy pattern de-sensitizes the sensitized medium adjacent to the information pattern which is established in the sensitized medium as an engraved pattern.

A sixth feature of this invention includes apparatus and method for storing and displaying information reversibly with a rubber sheet. The rubber sheet is thermally annealed to establish it in a particular physical condition at which it manifests rubber-like elasticity and is selectively stressed therefrom to a selected strain state below its elastic limit. A thermal pattern of the information is imparted to the sensitized rubber sheet. The information is stored therein as local and differential changes of the strain state. The stored information is retrieved from the rubber sheet by appropriately sensing a display of the changes of the strain state.

A seventh feature of this invention includes apparatus and method for displaying dynamically a thermal pattern of information with a rubber sheet. The rubber sheet is thermally annealed to establish it in a particular physical condition at which it manifests rubber-like elasticity. It is selectively stressed sequentially therefrom to a selected strain state below its elastic limit. The thermal pattern of information is parted to the sensitized rubber sheet and is displayed thereby as characteristics of representative local and differential changes in the strain state.

An eighth feature of this invention includes apparatus and method for displaying statically a thermal pattern of information with a rubber sheet. The rubber sheet is thermally annealed to establish it in a particular physical condition at which it manifests rubber-like elasticity. It is selectively stressed sequentially therefrom at least to a particular strain state below its elastic limit. The particular strain state is obtained by a spontaneous transformation of the strain in the rubber sheet. The rubber sheet is selectively relaxed from the established strain state to an intermediate strain state at which it is sensitized for displaying the information statically. The thermal pattern of information is imparted to the sensitized rubber sheet and the information is displayed statically thereby as local and differential changes in the intermediate strain state.

A ninth feature of this invention includes apparatus and method for displaying statically a thermal pattern of information in a rubber sheet which has been displaying it dynamically. The rubber sheet is thermally annealed to establish it in a particular physical condition at which it manifests rubber-like elasticity. It is sensitized for the dynamic display of the pattern of information by selectively stressing it sequentially therefrom at least to a particular strain state below its elastic limit. The particular strain state is obtained by a spontaneous transformation of the strain. The pattern of information is displayed dynamically by the sensitized rubber sheet as characteristics of representative local and differential changes in the established strained state as a result of the thermal pattern having been imparted thereto. By selectively relaxing the rubber sheet from the established strain state to an intermediate strain state, the rubber sheet displays the information pattern statically.

A tenth feature of this invention includes apparatus and method for displaying a pattern of information permanently with a rubber sheet which has been displaying it statically. The rubber sheet is thermally annealed to establish it in a particular physical condition at which it manifests rubber-like elasticity. It is selectively stressed sequentially therefrom at least to a particular strain state below its elastic limit. The particular strain state is obtained by a spontaneous transformation of the strain in the rubber sheet. The rubber sheet is selectively relaxed from the established strain state to an intermediate strain state at which it is sensitized for displaying the pattern of information statically. After the pattern of information has been imparted to the rubber sheet to cause it to be displayed thereby statically as characteristics of representative local and differential changes in the intermediate strain state, the pattern is displayed permanently by the rubber sheet by selectively stressing it sequentially to a selected strain state below its elastic limit.

An eleventh feature of this invention includes apparatus and method for displaying the shadings of an information energy pattern either in black, grey and white or in aspects of the color spectrum with a rubber sheet selectively sensitized therefor. The rubber sheet is selectively stressed to a selected strain state below its elastic limit and the information energy pattern is imparted thereto. Characteristics of local and differenial changes in a physical property related to the strain state in accordance with the information pattern display it. The displayed information pattern is observed through the analyzer lens of a polariscope. By selectively interposing a layer of transparent solidified viscose between the polarizer lens and analyzer lens of the polariscope, the shadings of the information pattern may be caused to appear either in black, grey and white or in aspects of the color spectrum.

A twelfth feature of this invention includes apparatus and method for enhancing the sensitivity of a rubber sheet which is selectively sensitizable for information handling by energy pattern conversion. The sensitivity of the rubber sheet is enhanced for the information handling by including therewith a material which has the capability of translating energy imparted thereto into thermal energy. In the practice of this feature of the invention, the material may either be incorporated within the rubber sheet or be disposed proximate thereto.

A thirteenth feature of this invention includes apparatus and method for displaying either a positive or a negative of an information pattern with a medium sensitizable therefor. The display of the information pattern by the medium is observed through the analyzer lens of a polariscope. By selectively altering the angular orientation of the analyzer lens relative to the angular orientation of the polarizer lens of the polariscope, the displayed information pattern may be caused to appear either as a positive or a negative.

A fourteenth feature of this invention includes apparatus and method for displaying a moving or changing information energy pattern with a sensitized medium. The display of the information is observed through the analyzer lens of a polariscope. The polarized light which illuminates the display in the medium is selectively varied to cancel for the observer the constant background energy pattern and thereby permit the observation solely of a moving or changing information energy pattern.

A fifteenth feature of this invention includes apparatus and method for displaying a temperature distribution map of an object with a medium sensitized therefor. A geometric map of the object is imparted to the sensitized medium by projecting an image thereon with emitted pattern of infrared radiant energy. A temperature distribution map of the object is displayed by the medium as characteristics of local and differential changes in a physical property thereof in accordance with the pattern of infrared radiant energy.

A sixteenth feature of this invention includes apparatus and method for storage and display of an information pattern with a medium sensitized therefor. The medium is sensitized by selectively stressing it sequentially to a selected strain state below its elastic limit. The thermal equilibrium of the sensitized medium is changed locally and differentially in acordance with the information pattern. A physical property of the sensitized medium is changed locally and differentially in accordance with the changes in the thermal equilibrium. The information pattern is displayed by the medium as characteristics of the physical property.

The term "rubber" is used herein to connote any material comparable with natural rubber in possessing the physical property of large elastic extensibility. The phrase "rubber-like elasticity" is used herein to connote a phenomenon associated with the rubber-like state of matter. Wherever a particular material is described herein for the practice of this invention, it is appropriately characterized.

Figure 1:
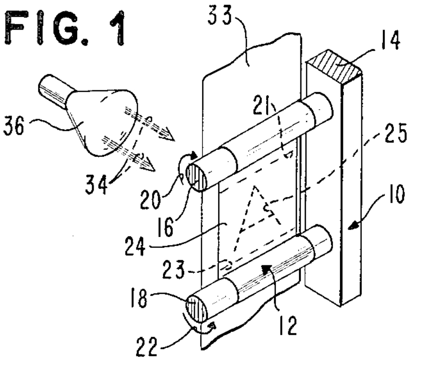
FIGURE 1 is a perspective view of apparatus for storing an image in a medium sensitized for thermal image conversion, illustrating the storage of a document image by a contact technique.
Figure 2:
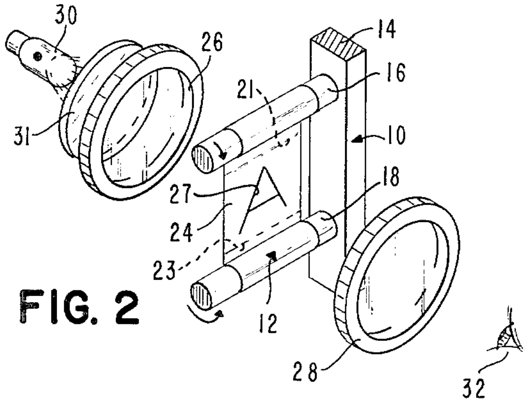
FIGURE 2 is a perspective view of apparatus for displaying the stored image of FIGURE 1, illustrating the use of a polariscope therefor.

With reference to the drawings, FIG. 1 shows a document adjacent to a sensitized medium in preparation for storage therein of the information pattern, e.g., the letter "A," on the document. FIG. 2 shows the sensitized medium with the letter "A" stored therein in position for information retrieval of its display with a polariscope.

With reference to FIG. 1 there is shown an apparatus 10 for stretching a rubber sheet 12 uniaxially. A rubber sheet is hereinafter referred to by the numeral 12 in several figures even though its shape and manner of mounting are different. The apparatus 10 includes a mounting structure 14 on which are rotatably mounted parallel cylindrical members 16 and 18. The rubber sheet 12 is attached at its respective ends to rollers 16 and 18, e.g., with pressure sensitive tape, not shown. Although a rectangular section of the rubber sheet 12 is suitable for the practice of this invention, it is preferably cut in a special fashion, illustrated by FIG. 3, to assure that a rectangular uniformly sensitized medium for information handling is established therein. The rubber sheet 12 is stretched uniaxially by causing the cylindrical members 16 and 18 to rotate in the directions indicated by the arrows 20 and 22, respectively.

For the purpose of exposition, it is assumed that the portion of the rubber sheet 12 between rollers 16 and 18, i.e., between dotted lines 21 and 23, is being viewed during the stretching thereof through the analyzer lens 28 of the polariscope of FIG. 2. However, the sensitized medium 24 may be established in the rubber sheet 12 by stretching it out of the presence of the polariscope of FIG. 2. A sensitized portion of the medium is hereinafter referred to by the numeral 24 if it is sensitized for information handling by energy pattern conversion therein. With reference to FIG. 2, a polarizer lens 26 is disposed on one side of sensitized medium 24 and analyzer lens 28 is disposed on the other side. A light source 30 illuminates one side of sensitized medium 24 via light diffuser 31 and polarizer lens 26. The other side of sensitized medium 24 is viewed via analyzer lens 28 by observer 32.

The technique for transferring a document information pattern to the sensitized medium 24 will be understood through reference to FIG. 1. The document sheet 33 is placed proximate to sensitized medium 24. The information pattern, e.g., the letter A, referred to by numeral 25, to be stored in the sensitized medium 24 is disposed on the side of the document sheet which faces infrared radiant energy source 36. The document sheet 33 is disposed between the sensitized medium 24 and the infrared radiant energy source 36. The document sheet 33 may be positioned on either side of sensitized medium 24 if the information to be stored therein faces the infrared radiant energy source 36. The information pattern 25 is stored in the sensitized medium 24 by momentarily irradiating the document sheet 33 with infrared radiant energy 34. It is stored in sensitized medium 24 as the letter A, referred to by numeral 27.

If the document sheet 33 is disposed between the sensitized medium 24 and infrared radiant energy source 36, the document sheet may be thick and have a different information pattern on its other side. If the document sheet 33 is disposed between sensitized medium 24 and infrared radiant energy source 36, several additional document sheets with information patterns thereon may be interposed between the document sheet 33 and sensitized medium 24. The intensity of radiant energy 34 is adjusted to store information pattern 25 on sensitized medium 24 if the additional document sheets are interposed as mentioned above. The number of document sheets which can satisfactorily be interposed is readily determined by experiment.

The information pattern 25 is stored in sensitized medium 24 as the letter A, and no significant portion of the other information on the back of document sheet 33 or anywhere on the additional interposed document sheets is stored in sensitized medium 24.

By relaxing the sensitized medium 24 to its original particular physical condition, discussed more fully hereinafter with reference to FIG. 3, the information pattern 27 is removed from the sensitized medium 24 and the sensitized medium becomes rubber sheet 12.

If the radiant energy 34 is too intense, the information pattern 27 is permanently stored in rubber sheet 12. Under this circumstance, if sensitized medium 24 is relaxed to its rubber sheet 12 physical condition, the information pattern 27 is not removed, i.e., upon returning rubber sheet 12 to the extension at which the information pattern 27 was stored therein, the information pattern 27 is again displayed with the same characteristics. Further, the remainder of the sensitized medium 24 is available for information handling either dynamically or statically in accordance with the practice of this invention.

Figure 3:
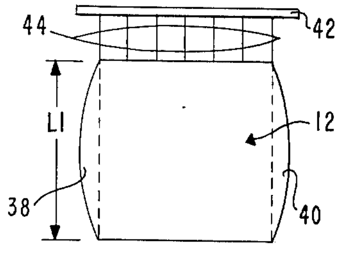
FIGURE 3 is a flat view of a medium for energy pattern conversion in a particular established physical condition at which it manifests elasticity illustrating a special shape therefor.
Figure 4:
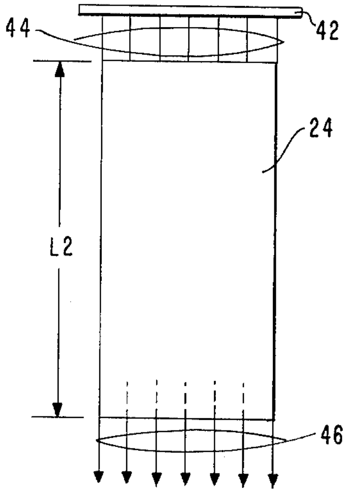
FIGURE 4 is a flat view of the medium of FIGURE 3 after it has been selectively stretched sequentially to a strain state below its elastic limit.
Figure 5:
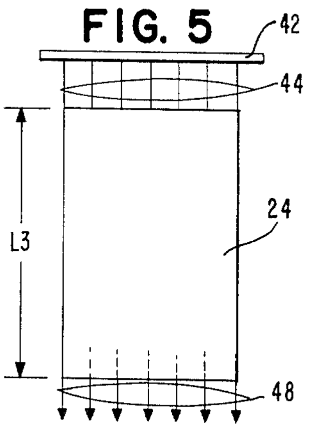
FIGURE 5 is a flat view of the medium of FIGURE 3 after it has been relaxed to an intermediate strain state.

The manner in which the sensitized medium 24 is established in the rubber sheet 12 for information handling by energy pattern conversion therein will be understood by reference to FIGS. 3 to 5. In FIG. 3 the rubber sheet 12 is shown cut with rounded edges 38 and 40. When it is stretched by rollers 16 and 18, the rubber sheet 12 with the rounded edges 38 and 40 has approximately straight sides. A rectangular rubber sheet curves in slightly at its sides when it is stretched uniaxially. The curvature results from the re-distribution of the rubber during the preparation of sensitized medium 24 from rubber sheet 12. For illustrative purpose, the rubber sheet 12 is shown affixed to support member 42 by lines 44. The lines 44 represent the manner in which it is affixed, e.g., by pressure sensitive tape. The rubber sheet 12 is established in a thermally annealed particular physical condition at which it has an extension L1. The rubber sheet 12 manifests rubber-like elasticity at the particular physical condition with a stress-strain hysteresis loop property. It has been determined that a rubber sheet 12 may be established in a thermally annealed particular physical condition. When it is stretched therefrom to an extension below its elastic limit via an extension at which it undergoes a spontaneous transformation of the strain and relaxed from the extension to the original thermally annealed particular physical condition, the stress-strain curve has a hysteresis loop property.

The spontaneous transformation of the strain appears to the observer 32, FIG. 2, as a smooth transistion of the color pattern of sensitized medium 24. During the transition, a color change occurs without the requirement for additional stretching of the rubber sheet 12. The spontaneous transformation of the strain in rubber sheet 12 is readily observable. The appearance of rubber sheet 12 during the spontaneous transformation is as if an orientation of the rubber sheet were taking place.

By application of a uniaxial force, illustrated by arrows 46, to the rubber sheet 12 at the physical condition thereof, indicated by FIG. 4, it is stretched sequentially to an extension L2 below its elastic limit where it is established as a sensitized medium 24. Sensitized medium 24 is sensitized for information handling dynamically at any extension L2 below the extension of the spontaneous transformation even if it has been partially relaxed during the stretching. However, it must be stretched sequentially above the extension for spontaneous transformation to establish a dynamically sensitized medium 24 in that extension zone. The sensitivity, resolution and contrast characteristics of a sensitized medium 24 for information handling dynamically are readily determined for any extension L2 by the practice of this invention.

In order to sensitize the rubber sheet 12 as a sensitized medium 24 for displaying an information pattern statically, it must be stretched to an extension L2 below its elastic limit via an extension at which it undergoes the spontaneous transformation. The rubber sheet 12, as dynamically responsive sensitized medium 24 at extension L2, is relaxed from extension L2 to the extension L3 shown in FIG. 5. At the extension L3, sensitized medium 24 is sensitized for information handling statically. The rubber sheet 12 may be stretched to an extension L2 greater than the extension at which the spontaneous transformation occurs and then be relaxed to the extension L3. The rubber sheet 12 may be relaxed from the extension at which the spontaneous transformation occurs to provide a sensitized medium 24 for information handling statially in accordance with this invention. The statically sensitized medium 24 of FIG. 5 is shown as being held uniaxially by force 48. The sensitivity, resolution and contrast characteristics of a sensitized medium 24 for information handling statically are readily determined for any extension L3 by the practice of this invention.

It has been determined that a selected vulcanized natural rubber sheet, a polymer of isoprene, is established in the physical condition of FIG. 3 by releasing all mechanical constraints thereon at an ambient temperature of approximately 25° C. It is believed that the vulcanized natural rubber sheet 12 is substantially isotropic in this condition, i.e., it is substantially unstrained. It is sensitized for the dynamic handling of information as per the technique described above with reference to FIG. 4. At any extension L2 or L3, the appearance of sensitized medium 24 to observer 32, as viewed through analyzer lens 28, is a color pattern. The phrase "color pattern" as used herein connotes grey shadings as well as shadings of the color spectrum. It is believed that the color pattern is due to the phenomenon of double refraction or birefringence as a result of the rubber sheet 12 being anisotropic in the strain state at the extension L2. Double refraction produced in an otherwise isotropic medium as a result of strain therein is commonly termed "forced double refraction."

It has been determined that a selected unvulcanized natural rubber sheet 12, a polymer of isoprene, is established in the physical condition of FIG. 3, at an ambient temperature of approximately 25° C., by relaxing the mechanical constraints thereon and thermally annealing it.

Figure 6:
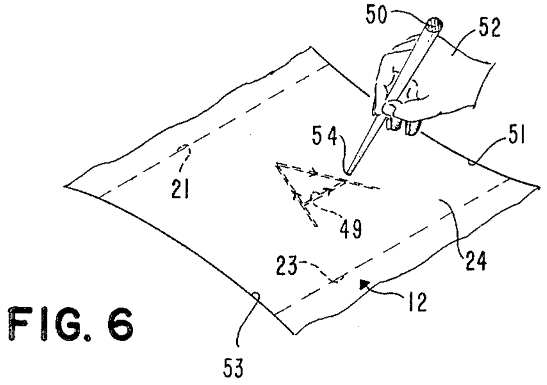
FIGURE 6 is a perspective view of a sensitized medium and a marking instrument, illustrating that an information pattern is inscribed in the medium by scribing thereon with a marking instrument.

FIGURE 6 illustrates that an information pattern, e.g., the letter A, referred to by numeral 49, is stored in a sensitized medium 24 of rubber sheet 12 by writing thereon with instrument 50 by hand 52. The sides 51 and 53 of the sensitized medium 24 are shown as having the characteristic inward curvature due to the redistribution of the rubber during the stretching, as described above. The writing instrument 50 has a rounded point 54 in order that the surface of sensitized medium 24 not be damaged thereby. The arrows on the letter A in FIG. 6 indicate the manner in which it was inscribed in sensitized medium 24.

Figure 7:
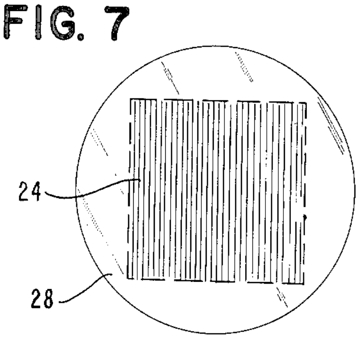
FIGURE 7 is a flat view of a sensitized medium as viewed through the analyzer lens of a polariscope, illustrating its apparent color characteristics.
Figure 8:
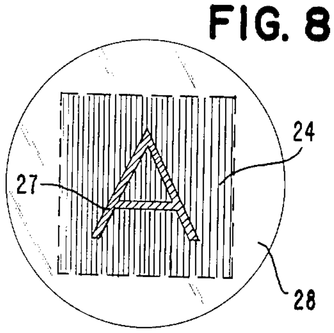
FIGURE 8 is a flat view of the sensitized medium of FIGURE 7 after an image has been stored therein, as viewed through the analyzer lens of a polariscope, illustrating the display of the shadings of the image by contrasting colors.

FIGS. 7 and 8 illustrate the color appearance of the sensitized medium 24 as viewed through the analyzer lens 28. FIG. 7 illustrates the appearance of sensitized medium 24 without an information pattern stored therein. FIG. 8 illustrates color appearance contrast for the region where the information pattern 49 is stored compared to the sensitized medium. The letter A, referred to by numeral 27 appears to an observer as one color on a background of another color.

Figure 9:
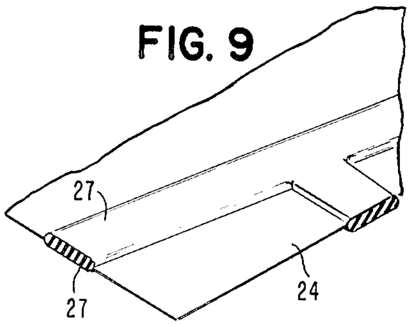
FIGURE 9 is a fragmentary view of a sensitized medium with an information pattern stored therein, illustrating that the image is embossed on both sides of the medium.

In FIG. 9, the sensitized medium 24 is shown as having the letter A, referred to by numeral 27, embossed thereon. The letter A is embossed on both sides of the sensitized medium 24. The embossing occurs where the information pattern is imparted to the sensitized medium by thermal energy as in FIG. 1. The information pattern 49 is also embossed on sensitized medium 24 by writing thereon as illustrated by FIG. 6.

Figure 10:
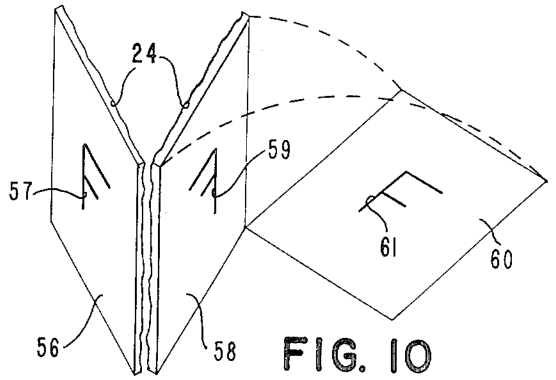
FIGURE 10 is a perspective view of a medium with an information pattern embossed thereon and a sheet of receptor material for printing, illustrating that the embossed pattern can be printed on the receptor material.

FIG. 10 illustrates a technique for printing an information pattern on a selected receptor in accordance with this invention. In FIG. 10, the sensitized medium 24 is shown fragmentized into a front side 56 and a back side 58. The information pattern, e.g., the letter F, imparted to the front side 56 has a reversed appearance on the back side 58. The portion of the letter F on the front side 56 is referred to by numeral 57. The portion of the letter F on the back side 58 is referred to by numeral 59. The back side 58 is coated with a suitable inking material in a conventional manner, and the letter F is printed on a suitable receptor material 60 by pressing the back side 58 thereon. The printed letter F on receptor material 60 is referred to by numeral 61.

Figure 11:
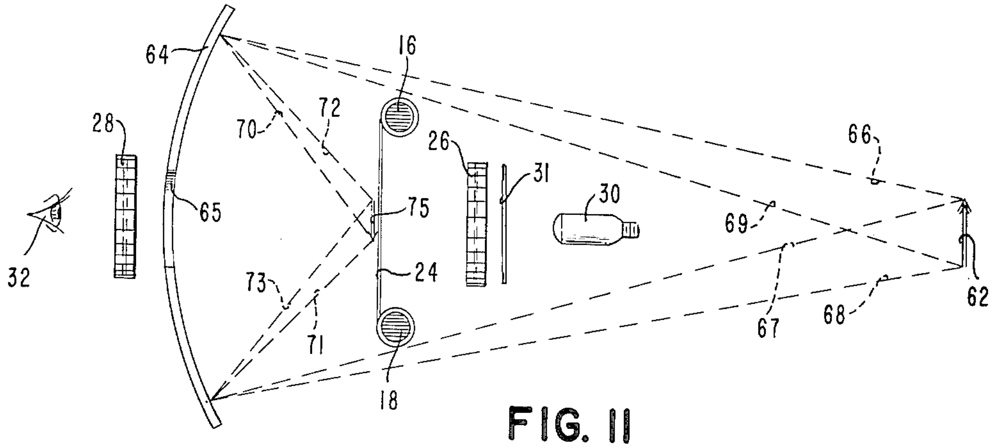
FIGURE 11 is a diagrammatic view of apparatus for storing a temperature distribution map of an object, illustrating that the temperature map is stored in a sensitized medium by focusing thereon the infrared radiant energy pattern from the object.

FIG. 11 illustrates that a temperature distribution map of an object may be imparted to a sensitized medium 24. An object 62 is placed in infrared radiant energy communication with a curved reflector 64, e.g., a paraboloid reflector with a circular opening 65 in the center for purpose of viewing sensitized medium 24 by observer 32 via analyzer lens 28. The radiant energy direct rays 66 to 69 strike the curved reflector surface 64 and are reflected therefrom as reflected rays 70 to 73, respectively. An inverted image of the object 62 is stored as information pattern 75 in sensitized medium 24. The information pattern 75 stored in sensitized medium 24 has characteristics of both the geometrical shape of object 62 and the temperature distribution map thereof.

Figure 12:
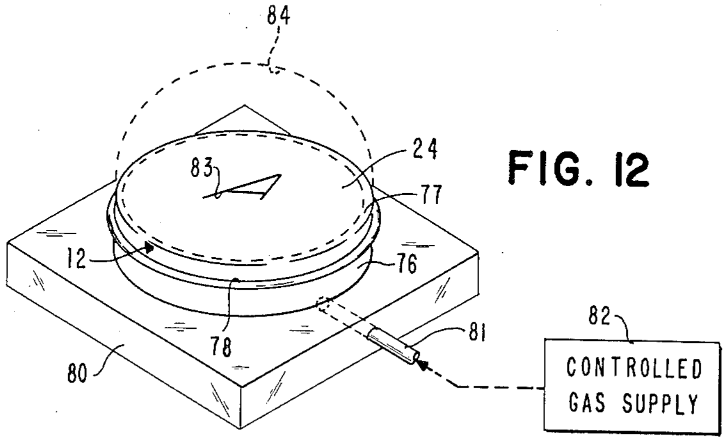
FIGURE 12 is a perspective view of apparatus for stressing a medium, illustrating that the medium can be sensitized by stretching it in a balloon-like manner.

For the practice of this invention, as presented by FIG. 12, the rubber sheet 12 is stretched and placed over cylindrical shell member 76 and is held in drum-head position 77 thereon by rubber O-ring 78. Cylindrical shell member 76 is affixed in gas pressure tight relationship with solid glass plate 80. The stretched extension of rubber sheet 12 in the drum-head position is one at which it is sensitizable for information handling statically. The rubber sheet 12 may be stretched unidirectionally, bidirectionally or radially for the drum-head position. The rubber sheet 12 in the drum-head position is thermally annealed with infrared radiant energy. Thereafter, it is stretched in a balloon-like manner by supplying a gas pressure from controlled gas supply 82 via conduit 81 to the volume defined by rubber sheet 12, cylindrical shell member 76 and glass plate 80. The rubber sheet is stretched to an extension 84 below its elastic limit via the extension at which the spontaneous transformation occurs. The rubber sheet 12 is relaxed to the drum-head position and is, in that position, a sensitized medium 24 for information handling statically. An information pattern, e.g., the letter A referred to by numeral 83 is shown in sensitized medium 24.

A rubber sheet 12 which is established in the thermally annealed physical condition in the drum-head position as described above, may be sensitized for information handling by selectively cooling it sufficiently below the ambient temperature. When the rubber sheet is returned to ambient temperature, a sensitized medium for information handling statically is provided.

Figure 13:
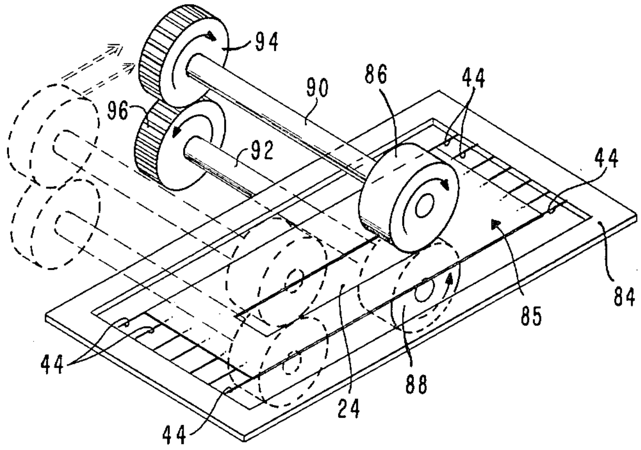
FIGURE 13 is a perspective view of apparatus for rolling a medium, illustrating that a medium can be sensitized by stressing it with a pair of compression rollers.

Another technique for establishing a sensitized medium 24 in a rubber sheet, is illustrated by FIG. 13. A rubber sheet is established on frame 84 by lines 44, e.g., representative of pressure sensitive tape, with an extension L3 at which it would be sensitized for information handling statically if stretched and relaxed as described above with reference to FIGS. 3 to 5. It is then thermally annealed and in this physical condition is indicated by numeral 85. A pair of cylindrical rollers 86 and 88 on shafts 90 and 92 are established in compression relationship with the rubber sheet 85. Shafts 90 and 92 are driven by gears 94 and 96, respectively, in a conventional manner. Gears 94 and 96 assure that rollers 86 and 88 roll while sensitizing rubber sheet 88. Rollers 86 and 88 are adjustably spaced in a conventional manner. The spacing between rollers 86 and 88 required to establish sensitized medium 24 in rubber sheet 85 for information handling statically is readily determined for the practice of this invention.

FIG. 14 illustrates a conventional schlieren optical system for projecting an information pattern in a sensitized medium to a projection screen. The information pattern appears on the projection screen inverted in both the vertical axis and the horizontal axis. The sensitized medium 24 is positioned on the right side of a double convex lens 100. Screen member 102 is positioned between sensitized medium 24 and projection screen 104. Screen member 102 has a transparent portion 105 and an opaque center portion 106 which is centered on axis 108. Light source 116 is positioned to left of condensing lens 111 on axis 108. Screen member 110 is positioned to the left of double convex lens 100 and between it and condensing lens 111. The sensitized medium 24 with the information pattern, e.g., the letter P, referred to by numeral 112 is disposed between double convex lens 100 and screen member 105. The letter P is shown facing the double convex lens 100. The adjustment of the schlieren optical system of FIG. 17 may be accomplished by so arranging its components in the absence of sensitized medium 24 that no light reaches projection screen 104. The information pattern on projection screen 104 is indicated by numeral 113.

An arrangement is shown in FIG. 15 whereby an information pattern 118 is imparted to a sensitized medium 24 by projection with infrared radiant energy 34 from infrared radiant energy source 36. The information pattern 118, e.g., the letter P, is established as an opening in an infrared opaque sheet 120. The opaque sheet 120 is established between source 36 and infrared radiant energy projection lens 122 on axis 124. Information pattern 118 is displayed by sensitized medium 24 as an embossed pattern thereon. Alternatively, if the sheet 120 is transparent to infrared radiant energy and the opening 118 is replaced by a material opaque to infrared radiant energy, information pattern appears in sensitized medium 24 as an engraved pattern 126 therein. A suitable material may be selectively deposited conventionally in the engraved pattern to display it in accordance with the characteristics of the deposited material.

The following are aspects of this invention which have been determined through the practice of the invention with a vulcanized natural rubber sheet and an unvulcanized natural rubber sheet:

(a) With reference to FIG. 2, an information pattern 27 stored statically in sensitized medium 24 may be stored permanently therein by stretching it to a different extension. At the new extension, thermal energy of considerable amount above that which would have erased the static information pattern does not impair it. When the sensitized medium 24 is relaxed to the position at which the information pattern 27 was being displayed statically, the information pattern 27 is again displayed statically.

(b) With reference to FIG. 2, when an information pattern 27 is being displayed dynamically by a sensitized medium 24 which has been stretched via the extension at which the spontaneous transformation occurs, it is displayed statically by the sensitized medium by relaxing it.

(c) With reference to FIG. 2, the extension at which the spontaneous transformation occurs may be caused to occur at a shorter extension if the rubber sheet 12 is stretched more rapidly. The spontaneous transformation may also be caused to occur at a shorter extension if the rubber sheet 12 is established in the thermally annealed particular physical condition at a lower ambient temperature and stretched at that ambient temperature.

(d) With reference to FIG. 2, static information pattern 27 on a sensitized medium 24 is caused to disappear from view if the medium is stretched sufficiently. If the medium is heated at the new extension the information pattern appears in view. However, it is somewhat distorted.

(e) An information pattern may be made to appear either as a positive or negative by suitably rotating the analyzer lens 28 relative to the polarizer lens 26. By rotating the polarizer lens or the analyzer lens at an appropriate angular velocity, a moving energy pattern is discriminated over a fixed background energy pattern if the sensitized medium is statically sensitized. The same type action causes a changing energy pattern to be discriminated over a fixed energy background if the sensitized medium is dynamically sensitized. The same effects can be accomplished by using two polarizers with appropriately synchronized lamp sources 30.

A description of several illustrative experiments is presented below to provide additional teaching of this invention:

Experiment I. A piece of vulcanized natural rubber, pure gum latex, having a thickness of 0.008 inch was prepared as a rubber sheet having the approximate surface dimensions of 2½ inches by 3 inches. The rubber sheet was established in a completely mechanically relaxed condition at an ambient temperature of approximately 25° C. Thereafter, it was stretched uniaxially and sequentially. During the stretching, the rubber sheet was observed through the analyzer lens of a polariscope. The analyzer lens was rotated before the stretching began so that the rubber sheet had the same appearance as it did when observed outside of the presence of polariscope. As the rubber sheet was stressed uniaxially, its appearance changed from light toward dark. The change in the color was such as one would describe if a sheet of glass changed from translucent toward opaque via grey shadings therebetween. The appearance of the rubber sheet with continued stress applied uniaxially thereto became colored in terms of the normal color spectrum. With increasing extension, the color patterns constantly changed until a particular extension was obtained. At the particular extension, the color pattern changed and the rubber sheet spontaneously transformed. The appearance was as if the color pattern was transformed smoothly. This transformation has been termed herein "the spontaneous transformation" for the practice of this invention. A thermal information pattern was displayed dynamically at any extension point after the appearance of the grey shading to an extension beyond the spontaneous transformation extension below its elastic limit. The rubber sheet was mechanically relaxed from the extreme extension toward the original extension. The displayed information pattern became increasingly static.

The sensitivity, resolution and contrast appeared to be maximum at an extension intermediate the spontaneous transformation extension and the original extension. The rubber sheet was relaxed to its relaxed condition and was resensitized. Its information handling property appeared to be unaffected by the cycle of operation.

Experiment II. The sheet of pure vulcanized natural rubber prepared for Experiment I was established in its mechanically relaxed condition. It was stretched sequentially to the extension at which the spontaneous transformation occurs. The rubber sheet was relaxed from the spontaneous transformation extension to the same intermediate extension as for Experiment I. The sensitivity, resolution and contrast appeared to be lower than for Experiment I. The rubber sheet was relaxed to its original condition and resensitized. Its information handling property appeared to be unaffected by the cycle of operation.

Experiment III. A 0.004 inch thick rubber sheet prepared from unvulcanized latex liquid solution by pouring it onto a sheet of glass and permitting it to air dry. The rubber sheet was stretched to an increasing elongation from a relaxed original condition at which it appeared to be translucent. The spontaneous transformation extension occurred within the light to dark region. The unvulcanized rubber sheet was then extended into the color region where color appearance occurred and relaxed therefrom. A spontaneous transformation extension was present. However, it occurred in the region of grey shadings. The sensitivity, resolution and contrast response of the sensitized unvulcanized rubber sheet was comparable to these characteristics for the vulcanized rubber sheet of Experiments I and II.

Experiment IV. A sheet of unvulcanized rubber was prepared by mixing liquid latex solution with india ink and pouring a film thereof onto a glass plate and permitting it to air dry. The rubber sheet appeared black. Both contact and projection information patterns were satisfactorily stored in the rubber sheet both dynamically and statically.

Experiment V. The extension at which spontaneous transformation occurs in the vulcanized rubber sheet of Experiment I was studied with respect to velocity of stretching and ambient temperature. It was determined that the spontaneous transformation extension occured at a smaller total extension if the rubber sheet were stretched faster. It was also determined that the spontaneous transformation extension occurs at a smaller total extension if the ambient temperature is less than 25°. It was also determined that if a sensitized rubber sheet with a static information pattern thereon were cooled sufficiently, it was rigid and retained the pattern.

Experiment VI. A static information pattern was established on the statically sensitized vulcanized rubber sheet of Experiment I. It was determined that when the rubber sheet was stretched, the observable image became distorted and with sufficient extension disappeared from view. However, when the rubber sheet was again relaxed to its original static storage position, the information pattern returned to display with somewhat degraded contrast.

Experiment VII. A static information pattern was imparted to a sensitized medium in the vulcanized rubber sheet of Experiment I. It was determined that the information pattern appeared either as a positive or negative by rotating the analyzer lens relative to the polarizer lens.

Experiment VIII. It was determined that a static information pattern could be made permanent by causing the membrane to be additionally stretched. The pattern was permanent in the sense that heat applied to the membrane in its additionally stretched condition did not erase the static image. It was also determined that a dynamic information pattern in a sensitized medium could be made static merely by relaxing the medium slightly. When the medium was stretched somewhat, the static image disappeared and the dynamic quality of the medium returned.

Experiment IX. It was determined that a rubber sheet which was stretched sequentially from a relaxed condition to an extension less than that at which the spontaneous transformation occurs could be cooled sufficiently to cause the spontaneous transformation to occur.

Experiment X. It was determined that it is possible to write on a sensitized membrane prepared in accordance with this invention. The writing was accomplished by the use of an instrument which did not mar the medium surface. The surface changes in the medium were comparable to those changes which occur as a result of imparting a thermal energy information pattern thereto. The medium for this experiment was prepared by stretching a rubber sheet uniaxially. After the information pattern was imparted thereto, the medium was grasped at the lateral edges and pulled away from the axis of the uniaxial stretch. The information pattern appeared to be separated at uniform intervals and the separation regions appeared to be transparent as viewed with a polariscope.

Experiment XI. It was determined that it was possible to alter a black and white image or a colored image interchangeably. The black pattern appeared to be colored and the colored pattern appeared in black and white. The foregoing was accomplished by placing a special filter between the polarizer and the analyzer. The filter was made from layers of viscose solidified in thin transparent sheets, e.g., cellophane tape.

Experiment XII. Two identical vulcanized rubber sheets were sensitized for information handling statically. They were placed at right angles and in contact. An information pattern appeared in black and white. The pattern appeared in color when one of the rubber sheets was viewed alone with a polariscope.

Experiment XIII. It was determined that an information in a sensitized medium prepared from an unvulcanized rubber sheet could be viewed as follows:

(a) By observing it with a polariscope.
(b) By projecting it with a schlieren optical system.
(c) By observing it by transmitted light.
(d) By observing it by reflected light.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for information handling by energy pattern conversion with a sensitized medium, comprising the steps of:
establishing a region of a selected rubber material in a particular physical condition at which it manifests elasticity;
stretching said region selectively from said physical condition to a selected strain state below its elastic limit, thereby establishing said region in a condition wherein it is sensitized to thermal energy patterns as local and differential variations in physical characteristics including surface typography; and
applying a thermal energy pattern representative of said information to said sensitized region.

2. A method for information handling by energy pattern conversion with a sensitized medium, comprising the steps of:
establishing a region of a selected rubber sheet material in a particular physical condition at which it manifests rubber-like elasticity;
stretching said region selectively from said physical condition to a selected strain state below its elastic limit, thereby establishing said region of said material in a condition wherein it is sensitized to thermal energy patterns and will display applied thermal energy patterns as local and differential variations in physical characteristcs including surface typography; and applying a thermal energy pattern representative of said information to said sensitized region.

3. A method for information handling by energy pattern conversion with a sensitized medium, comprising the steps of:

establishing a region of a selected rubber sheet in a thermally annealed particular physical condition at which it manifests rubber-like elasticity with a stress-strain hysteresis loop property;

stretching said region selectively from said physical condition to a selected strain state below its elastic limit, thereby establishing said region of said rubber sheet in a condition wherein it is sensitized to thermal energy patterns and will display applied thermal energy patterns as local and differential variations in physical characteristics including thickness; and applying a thermal energy pattern representative of said information to said sensitized region of said rubber sheet.

4. A method for information handling dynamically by energy pattern conversions with a sensitized medium, comprising the steps of:

establishing a region of a selected rubber sheet in a thermally annealed particular physical condition at which it manifests rubber-like elasticity with a stress-strain hysteresis loop property;

stretching said region selectively and sequentially from said physical condition to a selected strain state below its elastic limit, thereby establishing said region in a condition wherein it is sensitized to thermal energy patterns as local and differential variations in physical characteristics including thickness; and applying a thermal energy pattern representative of said information to said sensitized region.

5. A method for information handling dynamically by energy pattern conversion with a sensitized medium, comprising the steps of:

establishing a region of a selected rubber sheet in a thermally annealed particular physical condition at which it manifests rubber-like elasticity with a stress-strain hysteresis loop property;

stretching said region selectively, sequentially and unidirectionally from said physical condition to a selected strain state below its elastic limit, thereby establishing said region in a condition wherein it is sensitized to thermal energy patterns and will display applied thermal energy patterns as local and differential variations in physical characteristics including thickness; and applying a thermal energy pattern representative of said information to said sensitized region.

6. A method in accordance with claim 5, in which said region of said thermally annealed rubber sheet is stretched to a predetermined strain state below its elastic limit via a particular strain state at which a spontaneous transformation of the strain occurs; and said thermal energy pattern is applied while said sensitized region is in said predetermined strain state.

7. A method for information handling statically by energy pattern conversion with a sensitized medium, comprising the steps of:

establishing a region of a selected rubber sheet in a thermally annealed particular physical condition at which it manifests rubber-like elasticity with a stress-strain hysteresis loop property;

stretching said region selectively and sequentially to a selected strain state below its elastic limit via a particular strain state at which a spontaneous transformation of the strain occurs;

relaxing selectively said region from said selected strain state to an intermediate strain state, thereby establishing said region in a condition wherein it is sensitized to thermal energy patterns and will statically display applied energy patterns as local and differential variations in physical characteristics including surface typography; and applying a thermal energy pattern representative of said information to said sensitized region.

8. A method for information handling statically by energy pattern conversion with a sensitized medium, comprising the steps of:

establishing a region of a selected rubber sheet in a thermally annealed particular physical condition at which it manifests rubber-like elasticity with a stress-strain hysteresis loop property;

stretching said region selectively, sequentially and unidirectionally to a selected strain state below its elastic limit via a particular strain state at which a spontaneous transformation of the strain occurs;

relaxing selectively said region from said selected strain state to an intermediate strain state, thereby establishing said region in a condition wherein it is sensitized to thermal energy patterns and will display applied thermal energy patterns as local and differential variations in physical characteristics including thickness; and applying a thermal energy pattern representative of said information to said sensitized region.

9. A method for information handling permanently by energy pattern conversion with a sensitized medium, comprising the steps of:

establishing a region of a selected sheet of rubber material in a particular physical condition at which it manifests elasticity with a stress-strain hysteresis loop property;

stretching said region selectively to a selected strain state below its elastic limit via a particular strain state at which a spontaneous transformation of the strain occurs;

relaxing selectively said region from said selected strain state to an intermediate strain state, thereby establishing said region in a condition wherein it is sensitized to thermal energy patterns and will statically display applied thermal energy patterns as local and differential variations in physical characteristics including thickness;

applying a thermal energy pattern representative of said information in said sensitized region; and stretching selectively said sensitized region with said information therein to an increased strain state below its elastic limit, thereby permanently storing said thermal energy pattern.

10. A method for information handling permanently by thermal image conversion with a sensitized medium, comprising the steps of:

establishing a region of a selected rubber sheet in a thermal annealed particular physical condition at which it manifests rubber-like elasticity with a stress-strain hysteresis loop property;

stretching said region selectively to a selected strain state below its elastic limit via a particular strain state at which a spontaneous transformation of the strain occurs;

relaxing selectively said region from said selected strain state to an intermediate strain state, thereby establishing said region in a condition wherein it is sensitized to thermal energy patterns and will statically display applied thermal energy patterns as local and differential variations in physical characteristics including thickness;

applying a thermal image representative of said information in said sensitized region; and stretching selectively said sensitized region with said information therein to an increased strain state thereby permanently storing said thermal energy pattern.

11. A method for information handling statically by thermal image conversion with a sensitized medium, comprising the steps of:

establishing a region of a selected rubber sheet in a thermally annealed particular physical condition at which it manifests rubber-like elasticity with a stress-strain hysteresis loop property;

stretching said region selectively from said physical condition to a selected strain state below its elastic limit via a particular strain state at which a spontaneous transformation of the strain occurs thereby establishing said region in a condition wherein it is sensitized to thermal energy patterns and will dynamically display applied thermal energy patterns as local and differential variations in physical characteristics including thickness;

applying a thermal image representative of said information in said sensitized region; and relaxing selectively said sensitized medium with said information therein to a decreased strain state thereby staticizing said dynamically stored thermal image.

References Cited by the Examiner

UNITED STATES PATENTS

| | | | |
|---|---|---|---|
| 333,737 | 1/1886 | Fougeadoire | 101—426 |
| 1,681,991 | 8/1928 | Littleton | 73—88 |
| 2,014,688 | 9/1935 | Mabboux | 88—14 |
| 2,037,254 | 4/1936 | Miller | 101—426 |
| 2,165,974 | 7/1939 | Land | 40—130 |
| 2,243,706 | 5/1941 | Hille | 101—426 |
| 2,249,419 | 7/1941 | Craine | 101—426 |
| 2,491,386 | 12/1949 | Miller et al. | 96—27 |
| 2,537,329 | 1/1951 | Campbell | 96—27 |
| 2,583,150 | 1/1952 | Minter et al. | |
| 2,625,850 | 1/1953 | Stanton | 88—14 |
| 2,641,963 | 6/1953 | Carter | 88—24 |
| 2,891,165 | 6/1959 | Kuhrmeyer et al. | 250—65 |
| 2,928,075 | 3/1960 | Anderson | 340—173 |
| 2,974,370 | 3/1961 | Baird | 18—47 |
| 2,985,866 | 5/1961 | Norton | 340—173 |
| 2,999,035 | 9/1961 | Sahler | 250—65 |
| 3,022,541 | 2/1962 | Passley et al. | 18—48 |
| 3,073,953 | 1/1963 | Cohen et al. | 250—65 |
| 3,087,148 | 4/1963 | Ludewig | 88—61 |
| 3,111,584 | 11/1963 | Appeldorn | 250—65 |

FOREIGN PATENTS

| | | |
|---|---|---|
| 830,313 | 3/1960 | Great Britain. |

RALPH G. NILSON, *Primary Examiner.*

JEWELL H. PEDERSEN, *Examiner.*